United States Patent [19]

Killop

[11] Patent Number: 4,712,409
[45] Date of Patent: Dec. 15, 1987

[54] THREADING AND PROJECTION FORMING ON DIFFERENT SIZE DIAMETERS

[75] Inventor: James T. Killop, Warren, Mich.

[73] Assignee: Anderson-Cook, Inc., Fraser, Mich.

[21] Appl. No.: 772,792

[22] Filed: Sep. 5, 1985

Related U.S. Application Data

[63] Continuation of Ser. No. 564,478, Dec. 21, 1983, abandoned.

[51] Int. Cl.$^4$ .......................... B21H 3/06; B21H 5/02
[52] U.S. Cl. ........................................... 72/88; 72/469; 72/104
[58] Field of Search .................. 72/88, 90, 92, 93, 104, 72/105, 108, 469, 103

[56] References Cited

U.S. PATENT DOCUMENTS

| | | | |
|---|---|---|---|
| 367,879 | 8/1887 | Williams | 72/104 |
| 446,739 | 2/1891 | Jones | 72/88 |
| 470,805 | 3/1892 | Jones | 72/90 |
| 516,764 | 3/1894 | Fairbairn et al. | 72/104 |
| 2,760,388 | 8/1956 | Siebert | 72/88 |
| 3,429,162 | 2/1969 | Orlomoski | 72/90 |
| 3,913,476 | 10/1975 | Maquignaz et al. | 72/88 |
| 4,380,918 | 4/1983 | Killop | 72/88 |

FOREIGN PATENT DOCUMENTS

181609 4/1966 U.S.S.R. .

*Primary Examiner*—Daniel C. Crane
*Attorney, Agent, or Firm*—Reising, Ethington, Barnard, Perry & Milton

[57] ABSTRACT

An apparatus for forming splines in a first portion (22) of a shaft (13) of a workpiece (12) and a thread in a second portion (24) of the shaft (13) which has a smaller cross sectional diameter than the first portion (22), the apparatus including supports (26,28) for rotatably supporting the shaft (13) about the longitudinal axis A thereof and a pair of forming assemblies (36,36',38,38') mounted for movement with the workpiece (12) therebetween. The apparatus (10) is characterized by the forming assemblies (36,36',38,38') including oppositely opposed dies for simultaneously forming the splines in the first portion (22) of the shaft (13) having the larger cross sectional diameter and threads in the second portion (24) having the smaller cross sectional diameter in a single pass of the dies over the shaft (13). A method for forming the splines and threads includes the steps for supporting the shaft (13) for rotation about the center longitudinal axis A thereof between a pair of forming assemblies (36,36',38,38') mounted for movement with the shaft (13) therebetween and moving the forming assemblies (36,36',38,38') to form splines in the first portion (22) of the shaft (13) while simultaneously forming a thread in a second portion (24) of the shaft (13).

4 Claims, 12 Drawing Figures

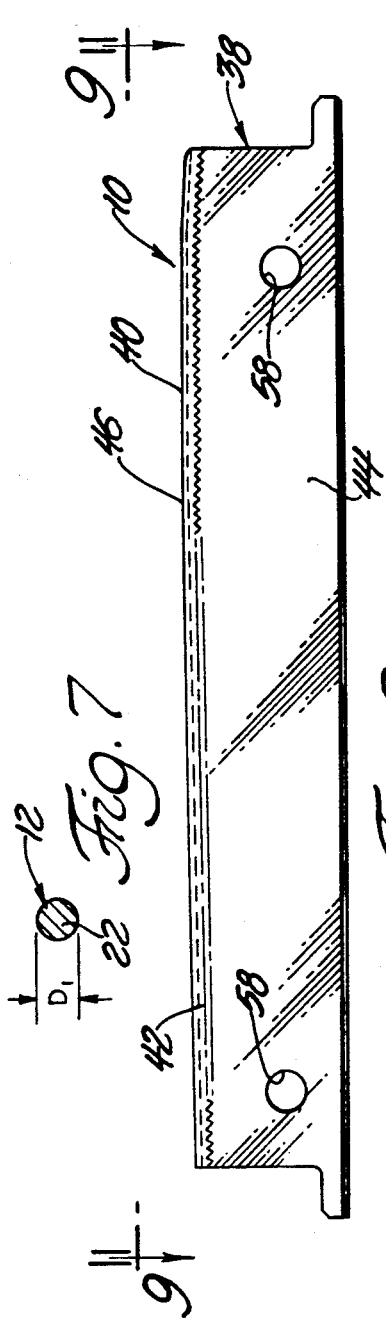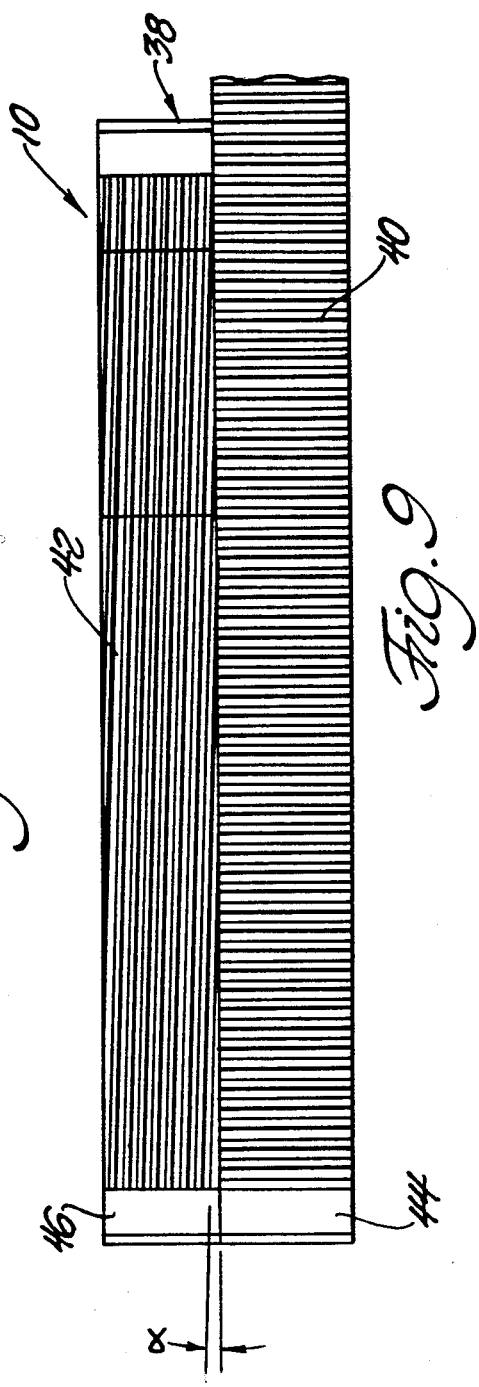

THREADING AND PROJECTION FORMING ON DIFFERENT SIZE DIAMETERS

This is a continuation of application Ser. No. 564,478, filed on Dec. 21, 1983, now abandoned.

TECHNICAL FIELD

This invention relates to an apparatus and method for cold forming a workpiece having multiple diameters. More particularly, this invention relates to forming a spline in one portion of the shaft of a workpiece and a thread in a second portion of the shaft.

BACKGROUND OF THE INVENTION

Formed metal workpieces often have a shaft or axle with a first portion having splines formed therein and a second portion which is threaded. For example, universal joints for vehicle drives conventionally include a joint member having four round surfaces of cylindrical shapes that are coaxial about a central axis of the joint member and have different diameters. The largest round surface is utilized with a seal to provide sealing of the joint, while the next largest round surface supports a bearing that mounts the joint. Both of the two smaller round surfaces are sequentially formed with projections, the larger one with splines utilized to rotatively couple the joint and the smaller one with a thread used in securing the joint in position.

A cooperable pair of moveable tools has been utilized to cold form noncylindrical workpieces as disclosed in the U.S. Pat. Nos. 4,192,292 to Simonds, issued Jan. 14, 1980 and 4,469,342 to Simonds, issued Feb. 24, 1981; 1,446,447 to Bingham, issued Feb. 27, 1923; 3,044,332 to Siebol, issued July 17, 1962; 3,466,918 to Marcovitch, issued Sept. 16, 1969; 3,498,095 to Marcovitch, issued Mar. 3, 1970; and 3,503,237 to Marcovitch, issued Mar. 31, 1970. The U.S. Pat. No. 2,825,251 to Raider issued July 19, 1952 discloses a pair of tools used to perform forming by holding one of the tools stationary and moving the other one with the workpiece between the two tools. The U.S. Pat. No. 65,575 to Loughran issued May 23, 1899 discloses a pair of straight tools that are moved rectilinearly to cold form a workpiece having a single cylindrical surface of a round shape.

Several problems are presented in forming a workpiece having a shaft with two portions of different diameters using prior art methods and assemblies. A blank may be formed including a cupped shaped portion and the shaft portion extending therefrom having three portions with different diameters, each portion having a substantially round cross section. The copending U.S. patent application to applicant Ser. No. 458,325, filed Jan. 17, 1983, discloses a method for cold sizing such a workpiece. Basically, the method is performed by mounting the workpiece for rotation about its central axis between a pair of die assemblies. Each of the die assemblies utilized include a plurality of dies having different sizing surfaces that extend parallel to the central axis of the workpiece respectively in alignment with the round surfaces of the workpiece. There is movement of the die assemblies in opposite directions as each engages the sizing surfaces of the dies with the round surfaces of the workpiece as the workpiece rotates about its central axis such that the sizing surfaces pressure size the round surfaces of the workpiece. In performing the method, it is also possible to continue the movement of the die assemblies in order to engage forming projections on the trailing end of one die of each die assembly with the aligned round surface of the workpiece to thereby form projections on this aligned round surface of the workpiece. Such projection forming can be utilized to provide splines on one of the round surfaces and can also be utilized to subsequently provide a helical thread on the other round surface of the workpiece. It is noted in the aforementioned application that only one round surface of the workpiece can be formed with projections at any given time due to the fact the the round surfaces have different speeds of circumferential movement for any given rate of the workpiece rotation and the die assemblies can each only have a single speed at any given time due to their meshed relationship with the workpiece at the projections being formed. Any attempt to simultaneously roll the spline and thread would result in unacceptable torsional stresses in the shaft causing breakage. The instant invention is directed to this problem and provides means for simultaneously forming the splines on one portion of a shaft and a thread in a second portion in a single pass wherein the two portions have different cross sectional diameters.

SUMMARY OF THE INVENTION

This invention provides an apparatus for forming splines in a first portion of a shaft and a thread in a second portion of the shaft which has a smaller diameter than the first portion, the apparatus including support means for rotatably supporting the shaft about the center longitudinal axis thereof and a pair of forming assemblies mounted for movement with the workpiece therebetween. The apparatus is characterized by the forming assemblies including die means for simultaneously forming the splines and threads in a single pass of the die means over the shaft. The invention further provides a method for forming the splines and threads, the method including the steps of supporting the shaft for rotation about the center longitudinal axis thereof between the pair of forming assemblies mounted for movement with the shaft therebetween and moving the forming assemblies to form splines in the first portion of the shaft while simultaneously forming a thread in the second portion of the shaft.

FIGURES IN THE DRAWINGS

FIG. 7 is a cross sectional view of the workpiece taken substantially along lines 7—7 of FIG. 5;

FIG. 8 is a side view of a die taken substantially along lines 8—8 of FIG. 3;

FIG. 9 is a plan view taken substantially along lines 9—9 of FIG. 8;

DETAILED DESCRIPTION OF THE DRAWINGS

An apparatus for forming splines constructed in accordance with this invention is generally indicated at 10 in the Figures. The apparatus 10 is for forming projections in a workpiece generally shown at 12.

Figure 2:
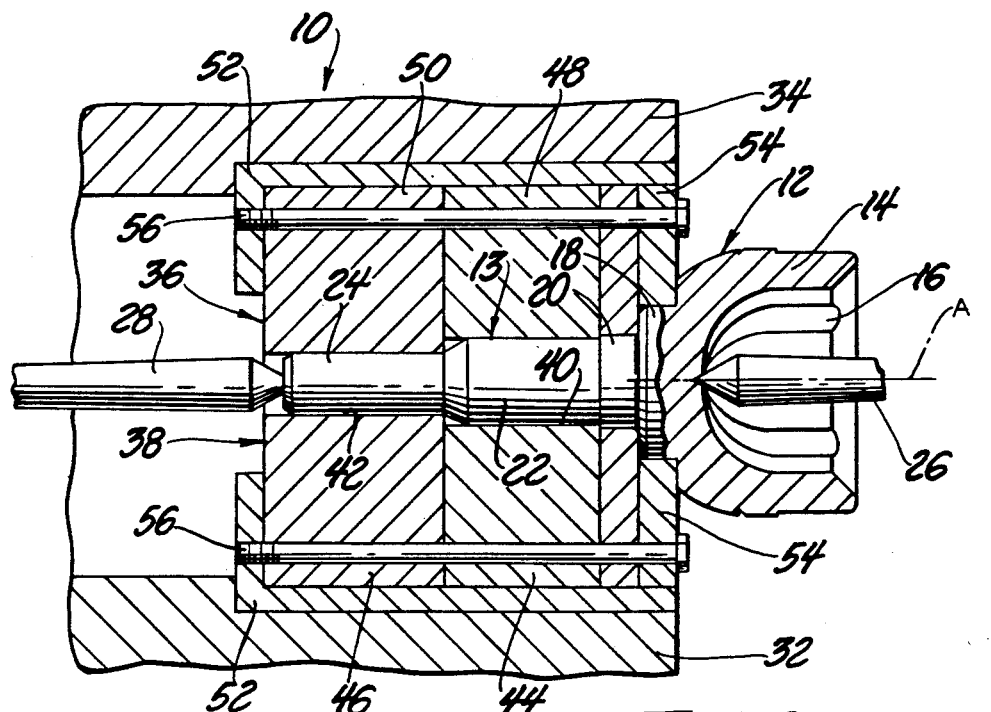
FIG. 2 is an enlarged cross sectional view taken substantially along lines 2—2 of FIG. 1.
Figure 3:
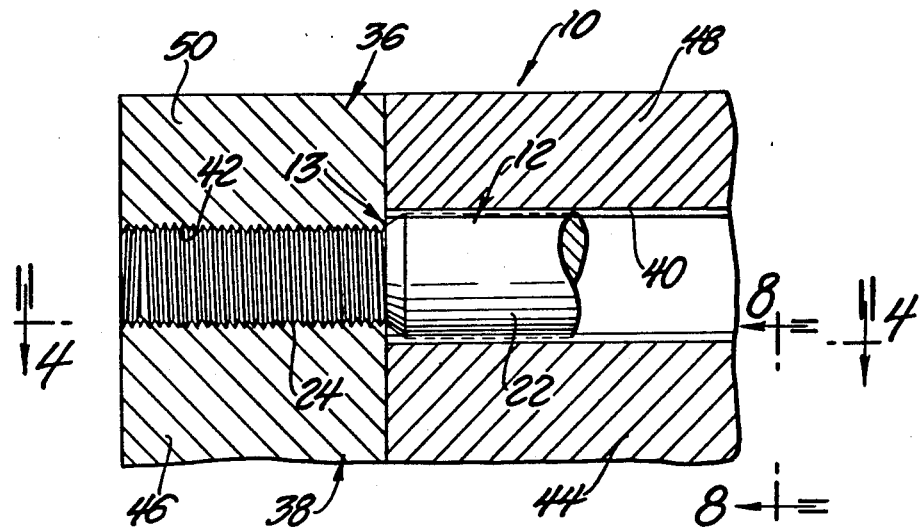
FIG. 3 is an enlarged cross sectional view of the invention.
Figure 5:
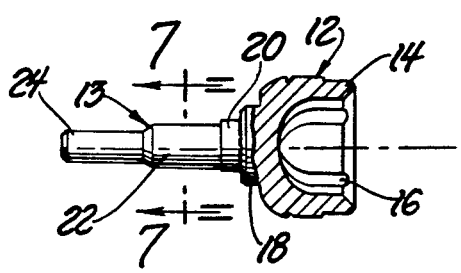
FIG. 5 is a side view partially in cross section of a sized workpiece.
Figure 6:
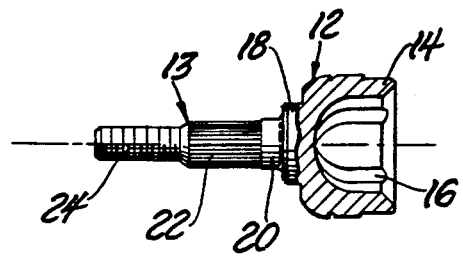
FIG. 6 is a side view partially in cross section of a workpiece having splines and threads formed therein.

The workpiece 12 is shown as a female member of a universal joint of the type used in vehicle drives. The workpiece 12 has a central axis A and includes a cupped shaped end 14 whose interior has grooves 16 for receiving balls that provide a coupling thereof to a male joint member which is not shown. The workpiece 12 includes a shaft generally shown at 13 projecting from a cupped shape end 14, the shaft 13 including round surfaces 18, 20, 22, and 24, when viewed in cross section. These round surfaces have cylindrical shapes that are coaxial about the central axis A of the workpiece 12 and have different diameters than each other. The largest diameter round surface 18 immediately adjacent the cupped shape end 14 is used to mount a seal that is used with the universal joint member, while the next smaller round surface 20 receives a bearing that is utilized to mount the joint member during use. The round surface 22 which is just slightly smaller than the round surface 20 is ultimately provided with splines to couple the joints during use. The smallest round surface 24 is ultimately provided with a helical thread for receiving a suitable nut that secures the joint member in position during use. Once the workpiece 12 is sized, as it appears that in FIGS. 2, 5 and 11, all of the round surfaces 18, 20, 22 and 24 have a smooth surface. As described above, the apparatus 10 forms splines in the round portion 22 and a helical thread in the round portion 24, as shown in FIG. 6.

Figure 1:
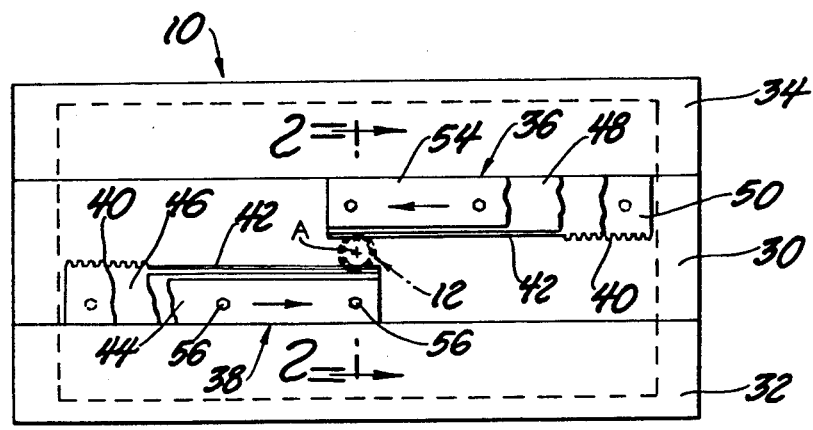
FIG. 1 is a schematic side view of the invention having a workpiece mounted therein.

The apparatus 10 includes support means for rotatably supporting the shaft 13 of the workpiece 12 about the center longitudinal axis A thereof. The support means comprises a headstock center 26 and a tailstock center 28 that rotatably mount the workpiece 12 about its central axis A. The headstock center 26 is mounted in a suitable manner on the connecting portion 30 of the apparatus 10 as illustrated in FIG. 1 while the tailstock center 28 is mounted in a suitable manner on an unshown arm that projects forwardly from either the lower base 32 or upper base 34 of the apparatus 10.

A pair of forming assemblies generally shown at 36 and 38 are mounted for movement with the workpiece 12 therebetween and are shown in FIGS. 1 through 4 and 8 and 9. The apparatus 10 is characterized by the forming assemblies 36, 38 including die means for simultaneously forming the splines in the first portion 22 having the larger cross sectional diameter and the helical threads in the second portion 24 having the smaller cross sectional diameter in a single pass of the die means over the shaft 13. Unlike prior art assemblies which would have required at least two passes to form the splines and threads on a shaft having two different diameter portions, this invention includes die means for simultaneously forming the splines and threads. More particularly, die means includes spline forming means 40 for forming a spline in the larger portion 22 of the shaft 13, having a diameter $D_1$ as shown in cross section in FIG. 7. The die means further includes thread forming means 42 for simultaneously forming a thread on the second smaller portion 24 of the shaft (13). The thread and the corresponding thread forming means 42 has a leading angle $\alpha$ wherein the tangent $\alpha$ is inversely proportional to the size of the diameter $D_1$. The thread forming surfaces 42 include thread forming projections having a constant pitch and the lead angle $\alpha$ wherein the tangent $\alpha$ is inversely proportional to the distance $D_1$. The spline forming surfaces 40 are spaced a predetermined distance apart, the thread forming surfaces 42 being spaced a predetermined distance apart which is greater than the first mentioned distance between the spline forming surfaces 40. The relationship between the leading angle and diameter $D_1$ can be expressed as:

$$\text{tangent } \alpha = \frac{P}{\pi D}$$

wherein P equals the constant pitch, and D equals the distance $D_1$. The significance of the equation is that under normal circumstances the leading angle $\alpha$, pitch P, and diameter of the shaft to be threaded are related as in the equation. However, it has been found through experimentation that with a shaft having two portions wherein the smaller portion is to be threaded and the larger portion is to have spline projections formed therein, the diameter of the larger portion may be substituted into the equation to calculate the lead angle of the thread formed in the smaller portion of the shaft to thereby construct the dies so as to simultaneously form the splines and thread. In essence, the dies of the assembly are spaced at different distances apart while the lead angle of the thread is that of a die that would normally be spaced farther apart or would equal the spacing of the spline forming die. It is believed that the unorthodox lead angle used forms the thread yet allows for slippage with the die thereby releasing the torsional forces of prior art assemblies while forming the thread and spline simultaneously. The economic advantages of this system are significant as the previously required two operations can now be performed simultaneously so that the time required for forming a part is significantly reduced.

As shown in the Figures, the thread forming surfaces 42 are adjacent to the spline forming surfaces 40.

Figure 4:
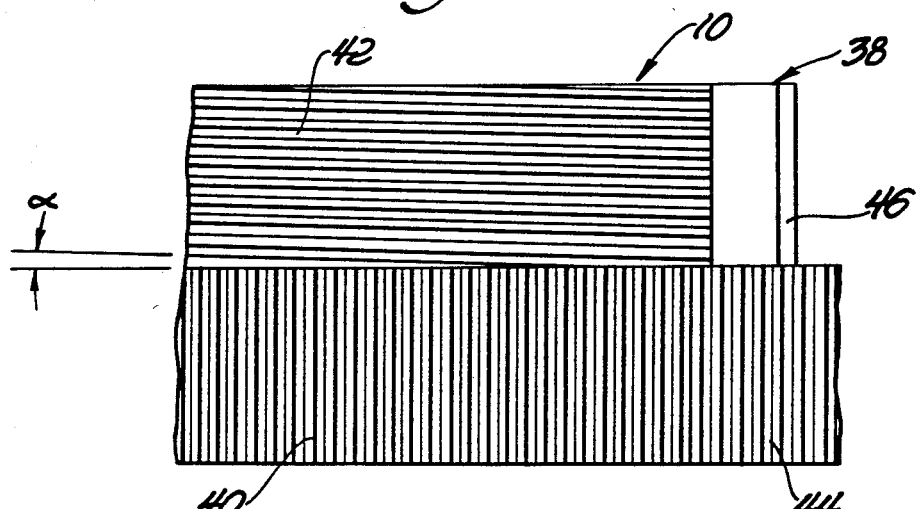
FIG. 4 is a plan view taken substantially along lines 4—4 of FIG. 3.

As shown in FIGS. 1–4 and 8 and 9, each of the forming assemblies 36 and 38 include a pair of dies 44, 46, and 48, 50 respectively, defining the die means of the invention. The dies 44, 46, 48, 50 include opposed flat spline forming surfaces 40 and flat opposed thread forming surfaces 42. The dies 44, 46, 48, 50 are mounted for rectilinear movement in a parallel relationship to each other to simultaneously form the threads and splines in the shaft 13 that is disposed therebetween. Each of the dies 44, 46, 48, 50 are mounted on a slide 52 and secured thereto by front plate members 54 and bolts 56. The bolts extend through openings 58 in the dies 44, 46, 48, 50 as shown in FIG. 8. Generally, the spline forming surface 40 is longer than the thread forming surface 42, as shown in FIGS. 4 and 9.

Figure 10:
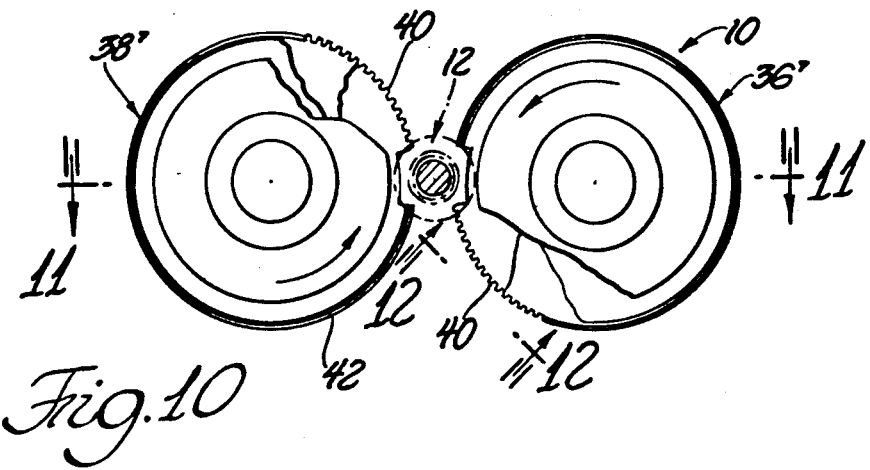
FIG. 10 is a side view of another embodiment of pair of dies constructed in accordance with the invention.
Figure 11:
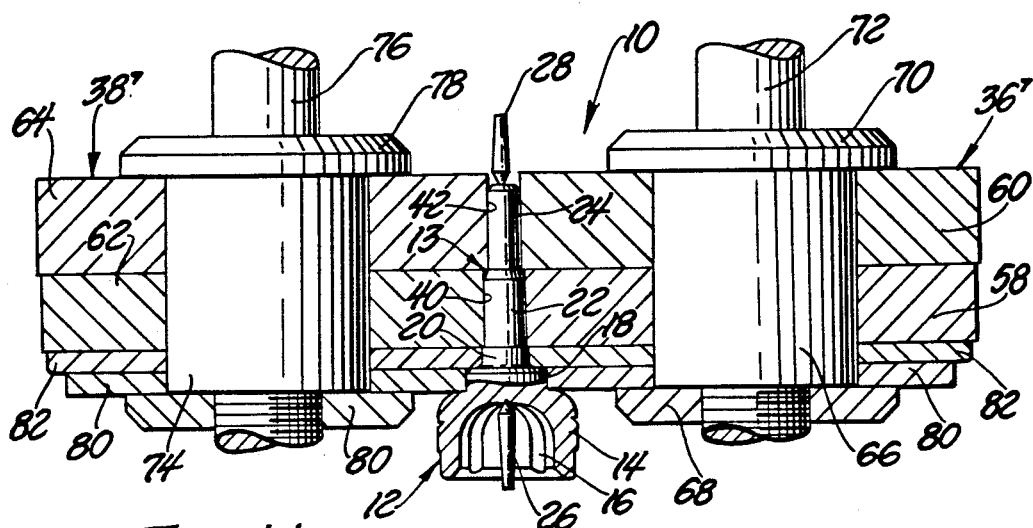
FIG. 11 is a cross sectional view taken substantially along lines 11—11 of FIG. 10.
Figure 12:
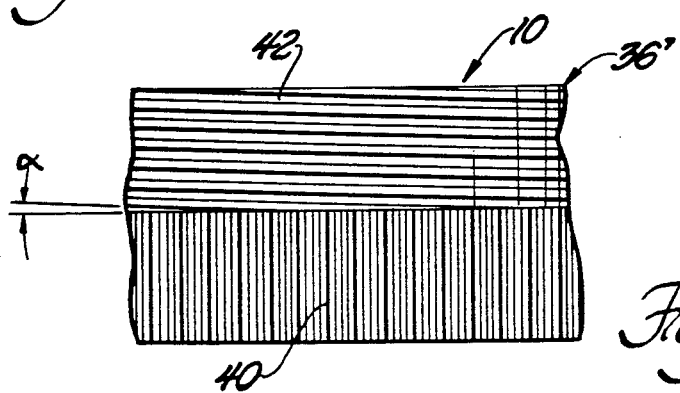
FIG. 12 is a plan view taken substantially along lines 12—12 of FIG. 10.

Another embodiment of the dies is shown in FIGS. 10 through 12. Each of the forming assemblies 36' and 38' include a pair of dies 58, 60 and 62, 64 respectively with opposed arcuate spline forming surfaces and opposed arcuate thread forming surfaces defining the die means. The dies 58, 60 and 62, 64 are mounted for rotary movement to simultaneously form threads and splines in a shaft (13) disposed therebetween. The dies 58 and 60 are mounted on a drum 66 and secured between plates 68 and 70 upon an axial 72. The dies 62 and 64 are likewise mounted on a drum 74 and secured upon an axial 76 by plates 78 and 80. The apparatus 10 may include dies 80 and 82 for engaging the round surfaces 18 and 20 respectively.

The invention further provides a method for forming the splines in the portion 22 of the shaft 13 and a thread in the smaller portion 24 of the shaft 13, the method including the steps of supporting the shaft 13 for rotation about the center longitudinal axis A thereof between the pair of forming assemblies 36, 36', 38, 38' mounted for movement with the shaft 13 therebetween and moving the forming assemblies 36, 36', 38, 38' to form splines in the first portion 22 of shaft 13 while simultaneously forming a thread in the smaller cross sectional portion 24 of the shaft 13. More particularly, the method is further defined by forming the thread on the second portion 24 of the shaft 13 having a leading angle $\alpha$ wherein the tangent $\alpha$ is inversely proportional to the size of the cross sectional diameter $D_1$ of the first portion 22 of the shaft. The leading angle is related to the diameter $D_1$ by the equation:

$$\text{tangent } \alpha = \frac{P}{\pi D}$$

wherein P equals the constant pitch of the threads and D equals the diameter $D_1$ of the first portion 22 of the shaft 13 of the workpiece 12.

The invention has been described in an illustrative manner, and it is to be understood that the terminology which has been used is intended to be in the nature of words of description rather than of limitation.

Obviously many modifications and variations of the present invention are possible in light of the above teachings. It is therefore, to be understood that within the scope of the appended claims wherein reference numerals are merely for convenience and are not to be in any limiting, the invention may be practiced otherwise that is specifically described.

What is claimed is:

1. A die of the type to be mounted in opposed relationship to an identical die on a support assembly defining a support axis for rotatably supporting a workpiece and defining a rotary axis for the workpiece, the dies being spaced apart from each other at the rotary axis on opposite side of the workpiece shaft portions, the workpiece including a first shaft portion having a diameter $D_1$, and a second shaft portion having a diameter less then $D_1$, said die comprising: a work surface having a spline forming portion (40) for engaging and cold forming splines in the first shaft portion (22) of the workpiece and a thread forming portion (42) for forming threads on the second shaft portion (24), said spline and thread forming portions (42,44) being disposed in side by side immovable relationship with respect to each other, said spline forming portion (44) being recessed with respect to said thread forming portion (42) for accommodating the greater diameter $D_1$ of the first shaft portion (22) to simultaneously engage the respective shaft portions (22,24) with the respective spline and thread forming portions (44,42), said thread forming portion including thread forming projections having a constant pitch and a lead angle $\alpha$ wherein $$\text{tangent } \alpha = \frac{P}{\pi D}$$

where P equals said constant pitch and D equals the diameter of the first portion of the workpiece shaft.

2. Apparatus for splining a first portion of a shaft of a preformed workpiece and simultaneously threading a second coaxial shaft portion that has a diameter smaller than the diameter of the first shaft portion, said apparatus comprising: support means defining a support axis for rotatably supporting the workpiece and defining a rotary axis for the workpiece; a pair of die assemblies each having work surfaces disposed on opposite sides of the shaft axis in opposed relationship so that the first and second shaft portions can be disposed between and engaged by the opposed work surfaces; said work surfaces each having a threading portion and a splining portion in side-by-side immoveable relationship with respect to each other; the threading and splining portions of one die assembly being respectively in opposed relationship with the threading and splining portions of the other die assembly; the splining portion of each die assembly being recessed with respect to its associated threading portion; said splining portions being formed with spline forming projections and said threading portions being formed with thread forming projections; said die assemblies being moveable with respect to each other to cause the opposed work surfaces to move in opposite directions; said opposed spline forming portions being spaced from each other at the rotary axis support means on the opposite sides thereof a distance related to the diameter of the first shaft portion such that the spline forming projections are engagable with the first shaft portion to pressure form splines thereon upon movement of the work surfaces past the rotary axis; said thread forming projections having a constant pitch and a lead angle $\alpha$ wherein $$\text{tangent } \alpha = \frac{P}{\pi D}$$

where P equals said constant pitch and D equals the diameter of the first portion of the workpiece shaft; said opposed thread forming portions being spaced from each other at the rotary axis of the shaft on the opposite sides thereof a distance related to the diameter of the second shaft portion such that the thread forming portions are engagable with the second shaft portion to form threads thereon simultaneously with the spline forming on the first shaft portion upon movement of the work surfaces past the shaft axis.

3. Apparatus as claimed in claim 2 wherein said opposed work surfaces are elongated and said pair of die assemblies are rectilinearly moveable with respect to each other to cause the opposed work surfaces to move in opposite directions.

4. Apparatus as claimed in claim 3 wherein said opposed work surfaces are arcuate and said pair of die assemblies are rotatably moveable with respect to each other to cause the opposed work surfaces to move in opposite directions.

* * * * *